Dec. 30, 1930.  A. MOORHOUSE  1,786,768
INSTRUMENT BOARD LIGHT
Filed Sept. 28, 1928  2 Sheets-Sheet 1

Inventor
ALFRED MOORHOUSE.
By
Attorney

Dec. 30, 1930. A. MOORHOUSE 1,786,768
INSTRUMENT BOARD LIGHT
Filed Sept. 28, 1928 2 Sheets-Sheet 2

Inventor
ALFRED MOORHOUSE
By Milton Tibbetts
Attorney

Patented Dec. 30, 1930

1,786,768

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

INSTRUMENT-BOARD LIGHT

Application filed September 28, 1928. Serial No. 308,954.

This invention relates to motor vehicles and more particularly to means for lighting the instrument boards thereof.

An object of the invention is to provide means for lighting a group of indicating instruments for use in the operation of a motor vehicle.

Another object of the invention is to provide means for lighting a group of indicating instruments for use in the operation of a motor vehicle and to so conceal the lighting means that it will be invisible to the occupants of the vehicle.

Another object of the invention is to provide in a single article of manufacture a lighting unit adaptable for installation in a motor vehicle so that light may be projected on the instrument board to light the operating instruments for observation by the operator.

A further object of the invention is to provide a lighting unit enclosed within the head bar of the cowl and arranged for the projection of light on the instrument board in such a manner that the direct rays of the light are projected away from the operator.

A further object of the invention is to provide a lighting unit for the instrument board of a motor vehicle arranged to deflect light through a translucent screen or other medium for softening the light rays and to provide means whereby the light on the instrument board may be intensified at will.

Yet a further object of the invention is to provide a lighting unit for the instrument board of a motor vehicle comprising means for deflecting and projecting light on the instrument board and means whereby the lamp may be readily removed or installed.

A still further object of my invention is to provide a lighting means for the instrument board of a motor vehicle which is highly efficient in operation and yet of marked simplicity as a whole and in respect to each of its component parts so that its manufacture may be economically facilitated both as regards to parts and their assembly.

Other objects of the invention will appear from the following description taken in connection with the drawings, which form a part of this specification, and in which.

Figure 1:
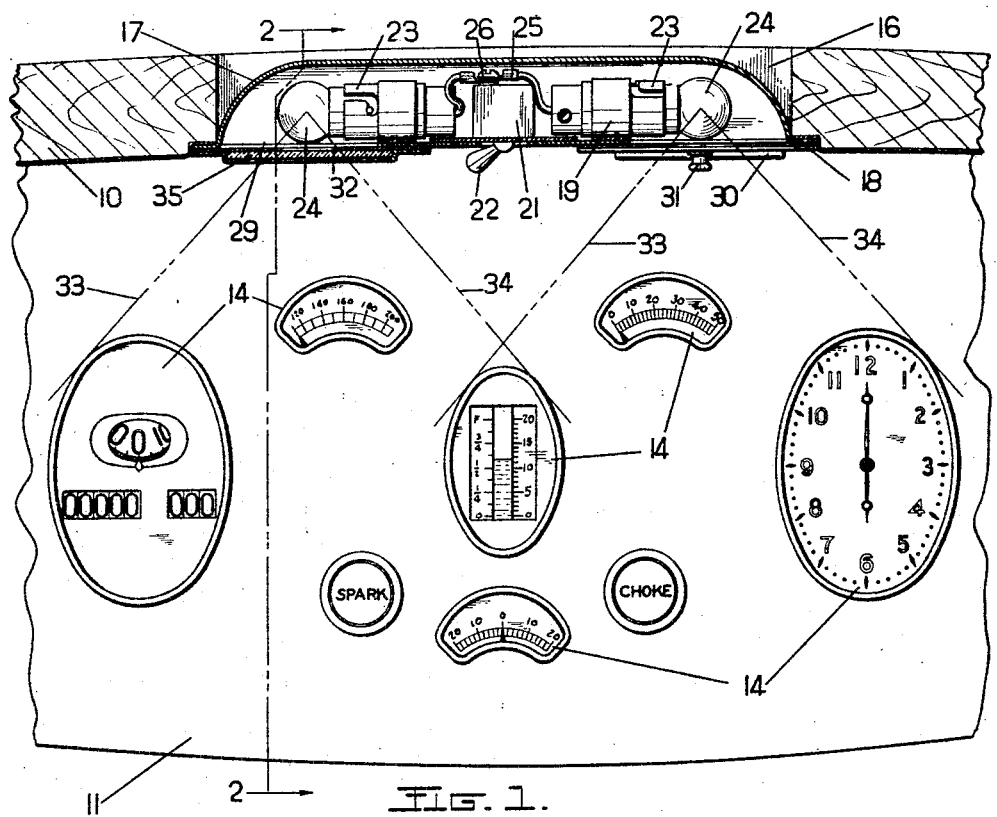
Fig. 1 is a front elevation of an instrument board and the head bar of the cowl of a motor vehicle illustrating the invention as applied, parts of the head bar and instrument board being broken away.
Figure 2:
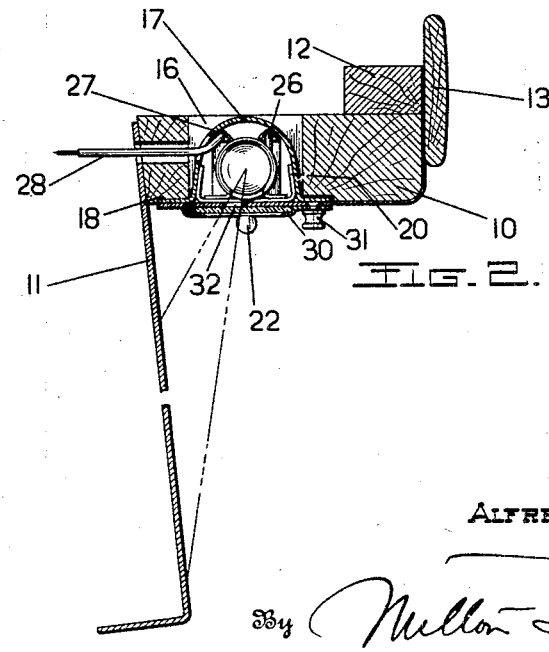
Fig. 2 is a cross sectional view on line 2—2 of Fig. 1.

Referring to the drawing for more specific details of the invention 10 represents the head bar of a cowl of a motor vehicle body and 11 an instrument board depending therefrom. The head bar has secured thereto a trim stick 12 and a garnish moulding 13. Indicating instruments 14 are suitably grouped or arranged on the instrument board for disclosing to the operator the condition of all the working parts of the vehicle to which attention should be frequently directed.

As shown, the instruments are disposed on the rear side of the instrument board with their respective dials plainly visible through suitable openings 15 in the board. The head bar 10 is provided with a slot 16 arranged in a perpendicular plane above and forwardly of the instrument board and substantially centrally disposed with respect to the indicating instruments. Positioned within the slot 16 and opening downwardly is a casing 17 having a flange 18 by means of which it is suitably secured to the head bar, and the interior of this casing is suitably treated or coated to effectively deflect light rays.

A support 19 is positioned within the casing and is suitably secured to the sides thereof at 20 as by spot welding or other means. Positioned centrally on the support is a switch box 21 encasing a switch, not shown, the operating lever of which is indicated at 22 where it is shown depending through an opening in the support. Arranged on the support on each side of the switch box 21 are lamp sockets 23 having mounted therein lamps 24, the sockets being suitably connected as by leads 25 to a terminal 26 of the switch, the other terminal 27 of the switch being connected by a wire 28 to a suitable source of electrical supply.

On each side of the supports are openings 29. As shown, these openings are immediately beneath the lamps 24 and are adequate in size to permit ready removal or replacement of the lamps. The openings 29 are covered by spring pressed closures 30. As shown, the closures 30 are mounted upon the flange of the casing by hinges of the spring piano type and are provided with knobs 31 for convenience in opening.

The closures are provided with slots 32 suitably positioned therein to direct the rays of light projected through the slots to a restricted zone over the face of the instrument board as most clearly indicated by dot and dash lines 33 and 34 and suitably translucent plates 35 are positioned on the closures over the slots to soften or tint the light so that it will not be objectional.

Figure 3:
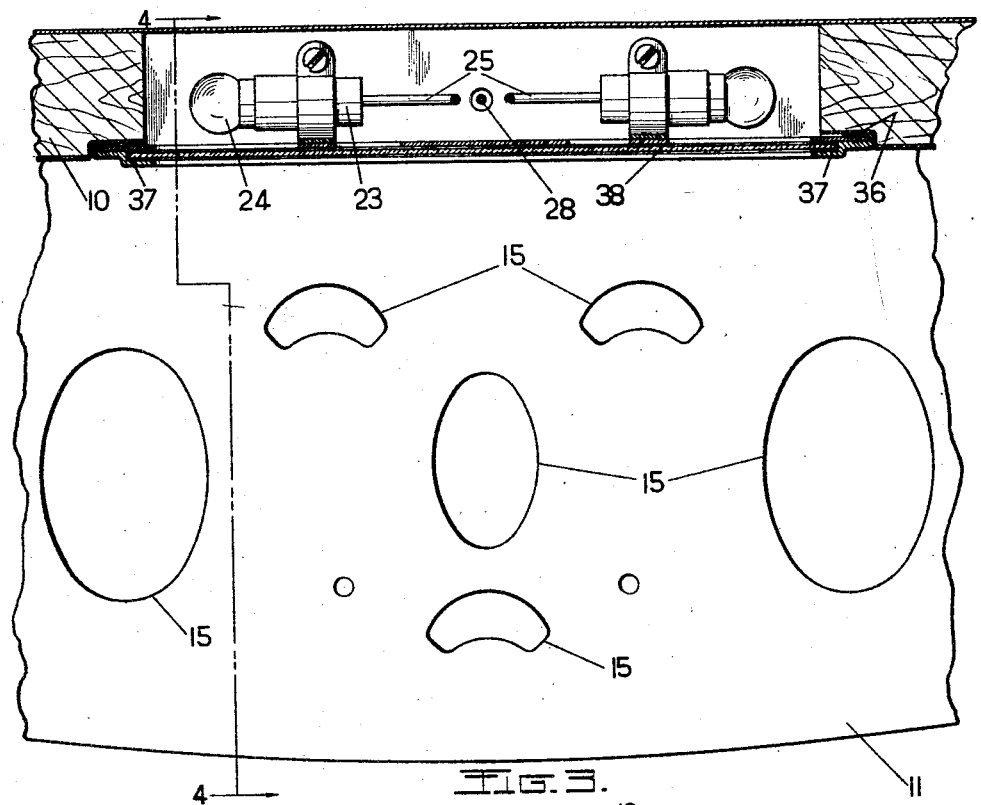
Fig. 3 is a view similar to Fig. 1 illustrating a modified form of the invention.
Figure 4:
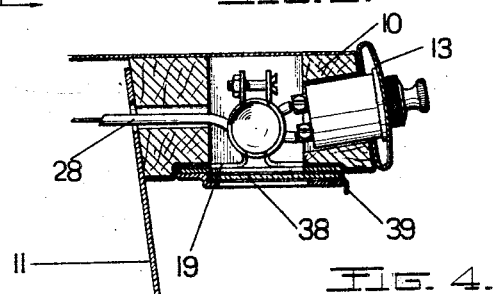
Fig. 4 is a sectional view taken on line 4—4 of Fig. 3.

In the modification shown in Figs. 3 and 4 the casing 17 has been eliminated and a cover plate 36 is mounted on the head bar in a rabbet formed upon the bottom of the bar around the slots 16 and a cover plate 36 is provided with suitable guides 37 in which is mounted a translucent slide 38 having a suitable pull 39 by means of which the slide may be operated to admit direct rays of light from the lamps to the instrument board and to the front compartment of the vehicle.

In the modification the lamp sockets 23 are mounted on the back of the cover plate 36 and the switch box is positioned in the head bar 10 with its operating button extending through the garnish moulding 13 secured on the face of the head bar. The form of switch employed is that type by means of which the lights may be turned on or off or flashed at the will of the operator.

Although this invention has been described in connection with a specific embodiment, the principles involved are susceptible to numerous other applications which will readily occur to persons skilled in the art. The invention is therefore to be limited only as indicated by the scope of the appended claims.

Having thus described the various features of my invention, what I claim and desire to secure by Letters Patent is:

1. A lamp comprising a casing having a supporting flange, a support positioned transversely in the casing, lamp sockets on the support, lamps in the sockets, a switch on the support positioned intermediate the sockets and connected thereto, the operating lever for the switch depending from the support, a cover plate for the casing positioned on the flange, the cover plate having openings registering with the lamps and closures for the openings.

2. A lamp comprising a casing, a supporting flange on the casing, a support arranged transversely in the casing, lamp sockets on the support, lamps in the sockets, a switch on the support positioned intermediate the sockets and connected thereto, the operating lever of the switch depending from the support, a cover plate for the casing having openings registering with the lamps and closures for the openings having means therein for restricting rays of light projected by the lamps.

3. A lamp comprising a casing having a supporting flange, a support positioned transversely in the casing, lamp sockets positioned on the support, lamps in the sockets, a switch arranged intermediate the sockets and connected thereto, the operating lever of the switch depending from the support, a cover plate having openings therein registering with the lamps and the operating lever of the switch, closures for the openings registering with the lamps, the closures having means for restricting light rays and means on the closures for modifying light rays.

4. In a motor vehicle, the combination of a cross bar, an instrument board depending therefrom, a casing positioned in the cross bar, lamps in the casing, a cover for the casing, a switch for the lamps having an operating lever depending through an opening in the cover.

5. In a motor vehicle, the combination of a cross bar and an instrument board arranged at an angle thereto, a casing positioned in the cross bar, lamps in the casing, a cover plate for the casing having openings registering with the lamps, closures for the openings having means for restricting rays of light from the lamps and means accessible below the cross bar for controlling the lamps.

6. In a motor vehicle, the combination with a cross bar, an instrument board supported at an angle with respect to the bar, a casing positioned in the bar, lamps in the casing, a cover for the casing having openings therein, closures for the openings having means for restricting rays of light from the lamps, means on the closures for softening the rays of light projected by the lamps and means depending from the cover for controlling the lamps.

7. In a motor vehicle, the combination with the cross bar of a cowl and the instrument board, the cross bar having positioned therein a slot, a casing fitted in the slot, lamps in the casing, a switch connected to the lamps and an operating lever for the switch depending from the casing, a cover for the casing having openings therein, closures for the openings having means for restricting rays of light projected by the lamps and translucent material on the closure for softening the rays of the light.

8. In a motor vehicle, the combination with a cross bar and the instrument board supported thereby, the cross bar having a slot therein, a casing positioned in the slot, a diaphragm in the casing, lamp sockets positioned on the diaphragm, lamps in the sockets, a switch intermediate the lamp sockets and leads connecting the switch to the lamp sockets, an operating lever for the switch depending from the diaphragm and a cover plate having openings opposite the lamps, closures for the openings having slots adapted to restrict the rays of light projected by the lamps and translucent covers for the slots.

9. In a motor vehicle, the combination of an instrument board and a cross head supporting the board, a plurality of instruments arranged on the instrument board beneath the cross head, a casing positioned in the cross head immediately above the instruments, a diaphragm positioned in the casing, lamp sockets on the diaphragm, lamps in the sockets, a switch arranged intermediate the sockets and connected thereto by leads, a cover plate having openings registering with the lamps, closures for the openings and means carried by the closures for restricting and modifying the rays of light projected by the lamps.

10. In a motor vehicle, an instrument board, a cross member supporting the board, the cross member having a slot, a cover plate for the slot, lamp sockets arranged on the cover plate, a switch positioned on the cover plate between the lamp sockets and connected thereto, an operating lever for the switch depending from the cover plate, the cover plate having openings therein and means upon the cover plate for softening and modifying rays of light projected by the lamps through the openings in the cover plate.

11. In a motor vehicle, an instrument board, a cross member supporting the instrument board, the cross member having a slot arranged in the vertical plane thereof, a cover plate for the slot, lamp sockets positioned on the cover plate, a switch interposed between the sockets and connected thereto by leads, lamps in the sockets, an operating lever for the switch, the cover plate having openings therein and a translucent slide for the openings.

In testimony whereof I affix my signature.

ALFRED MOORHOUSE.